Jan. 16, 1951 J. M. WALTER Re. 23,331

PLANER DRIVE

Original Filed Oct. 21, 1944 3 Sheets-Sheet 1

INVENTOR.
John M. Walter
BY Allen & Allen
Attorneys

Jan. 16, 1951 J. M. WALTER Re. 23,331

PLANER DRIVE

Original Filed Oct. 21, 1944 3 Sheets-Sheet 2

INVENTOR:
John M. Walter
BY Allen & Allen
Attorneys

PLANER DRIVE

Original Filed Oct. 21, 1944 3 Sheets-Sheet 3

INVENTOR.
John M. Walter
BY
Allen & Allen
Attorneys

Reissued Jan. 16, 1951

Re. 23,331

UNITED STATES PATENT OFFICE 23,331

PLANER DRIVE

John M. Walter, Cincinnati, Ohio, assignor to G. A. Gray Company, Cincinnati, Ohio, a corporation of Ohio Original No. 2,504,366, dated April 18, 1950, Serial No. 559,707, October 21, 1944. Application for reissue May 6, 1950, Serial No. 160,571

6 Claims. (Cl. 90—58)

Matter enclosed in heavy brackets [ ] appears in the original patent but forms no part of this reissue specification; matter printed in italics indicates the additions made by reissue

My invention relates to drives for metal planers and the like and is directed toward an arrangement whereby floor space will be conserved, and the heavy drive motor for the table drive located in the angle between the housing or column and the bed. The illustrated example is that of an open side planer, although obviously double column machines will be equally applicable.

It has been proposed in the past to drive the rack on the under side of a planer table by means of a worm drive, in which the worm shaft is provided with a bearing in the bed at an angle to the length of the bed, thus permitting the location of the power motor and gearing for the worm shaft in a space saving position such as employed in my invention.

Such a drive, however, requires a slow speed shaft and a high torque and is not satisfactory in many instances for that reason.

According to my invention, I employ a high speed shaft, which shaft is thus of low torque. Within the bed of the planer I locate a speed reduction drive which begins with a beveled (preferably hypoid) gear which meshes with a beveled hypoid pinion supported in bearings within the bed and provided with a flexible coupling to the end of the high speed shaft. This shaft is also connected to the motor shaft by another flexible coupling so that it is a floating shaft.

This arrangement permits me to locate the motor for the high speed shaft in the angle between the housing or column and the bed of the planer, without critical problems of alignment, thus saving the floor space usually occupied by the standard drive motor for the table drive which is normally at the side of the column and incidentally cutting down the number of gears in the table drive which in the normal or right angle drive, have been found necessary in the past.

Figure 1:
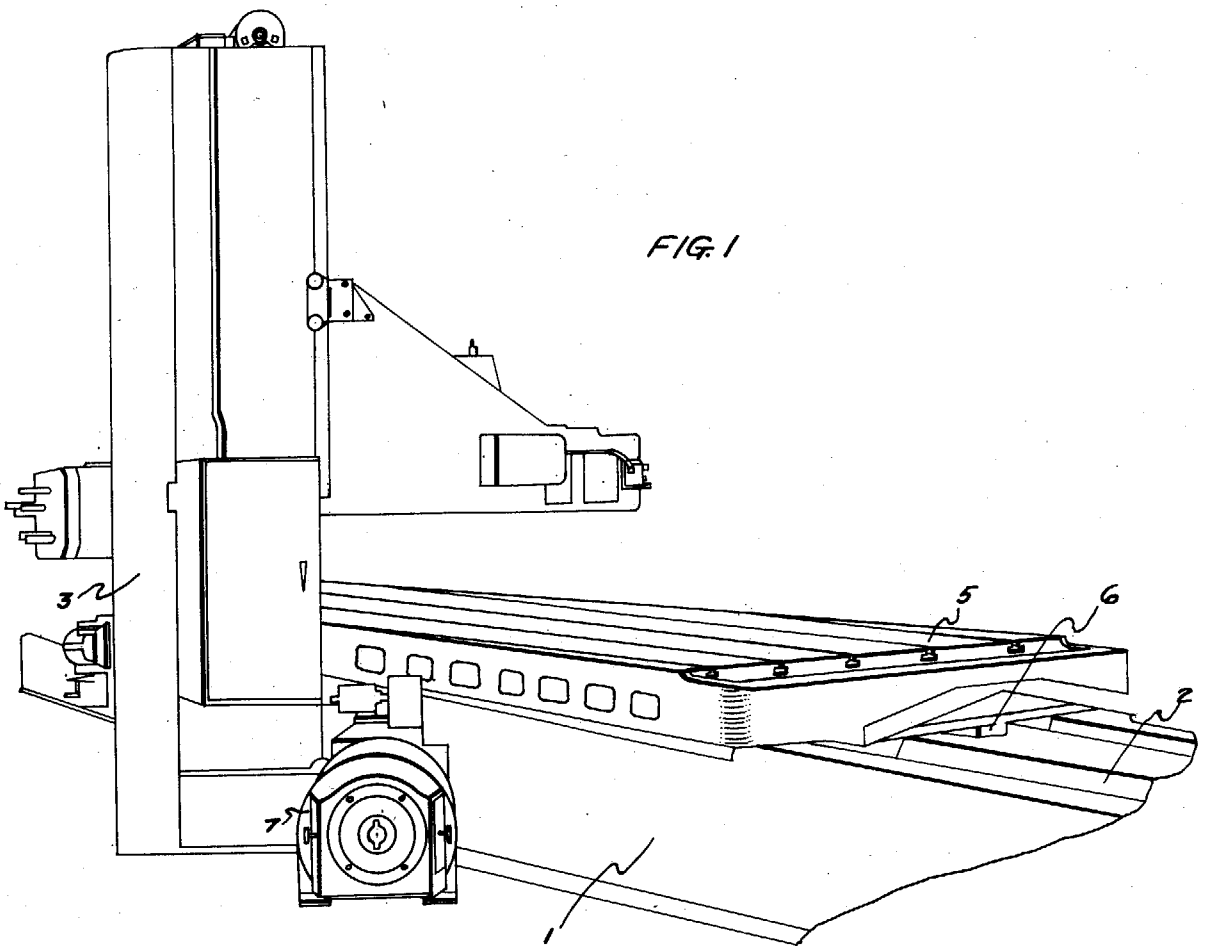
Figure 1 is a perspective view showing the location of the drive motor with reference to the column or housing and the bed, showing the table in place.
Figure 2:
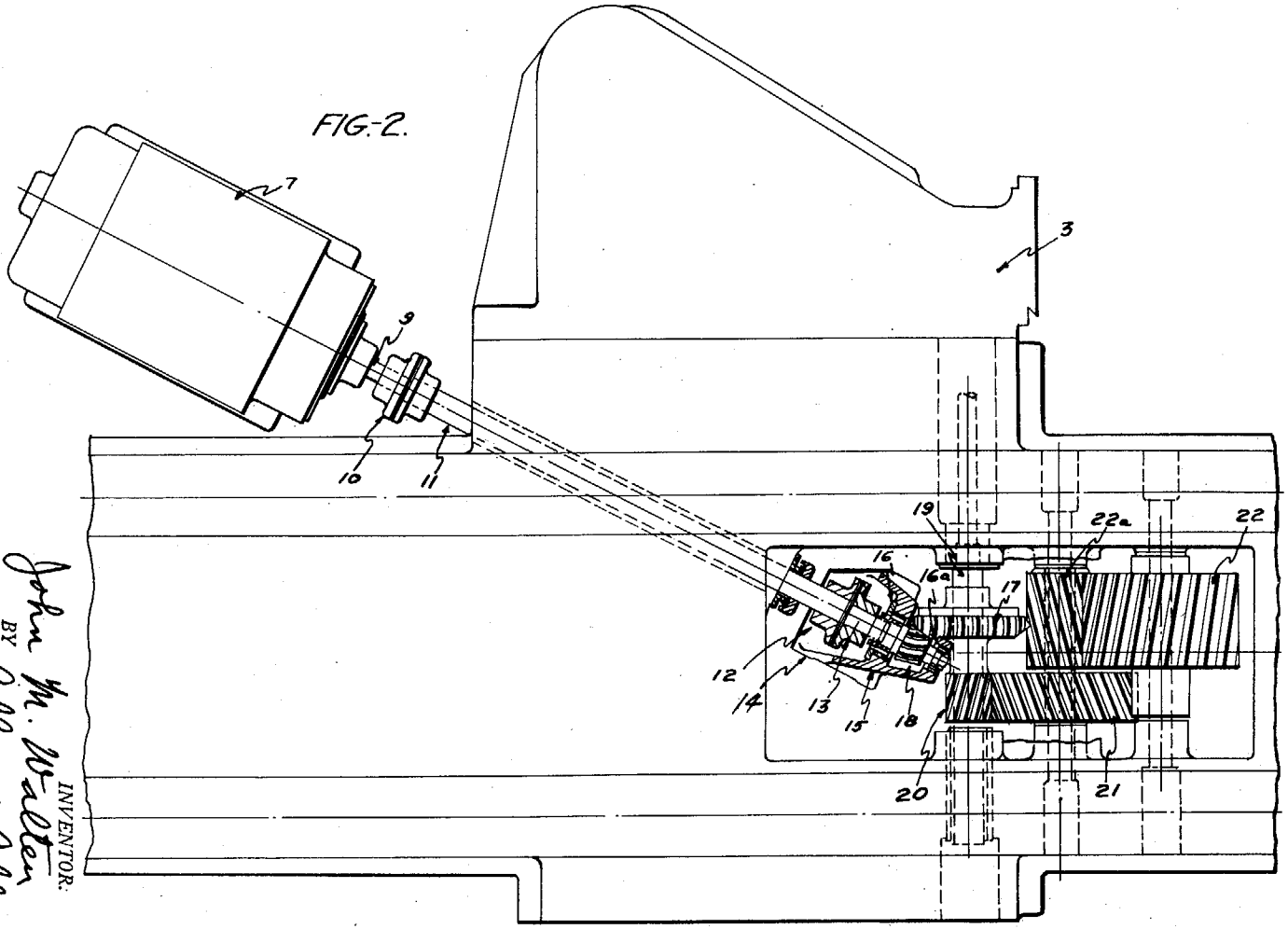
Figure 2 is a plan view of the portion of the bed adjacent the column, showing the drive located therein; the drive motor, drive shaft bearing and the support for the drive pinion.
Figure 3:
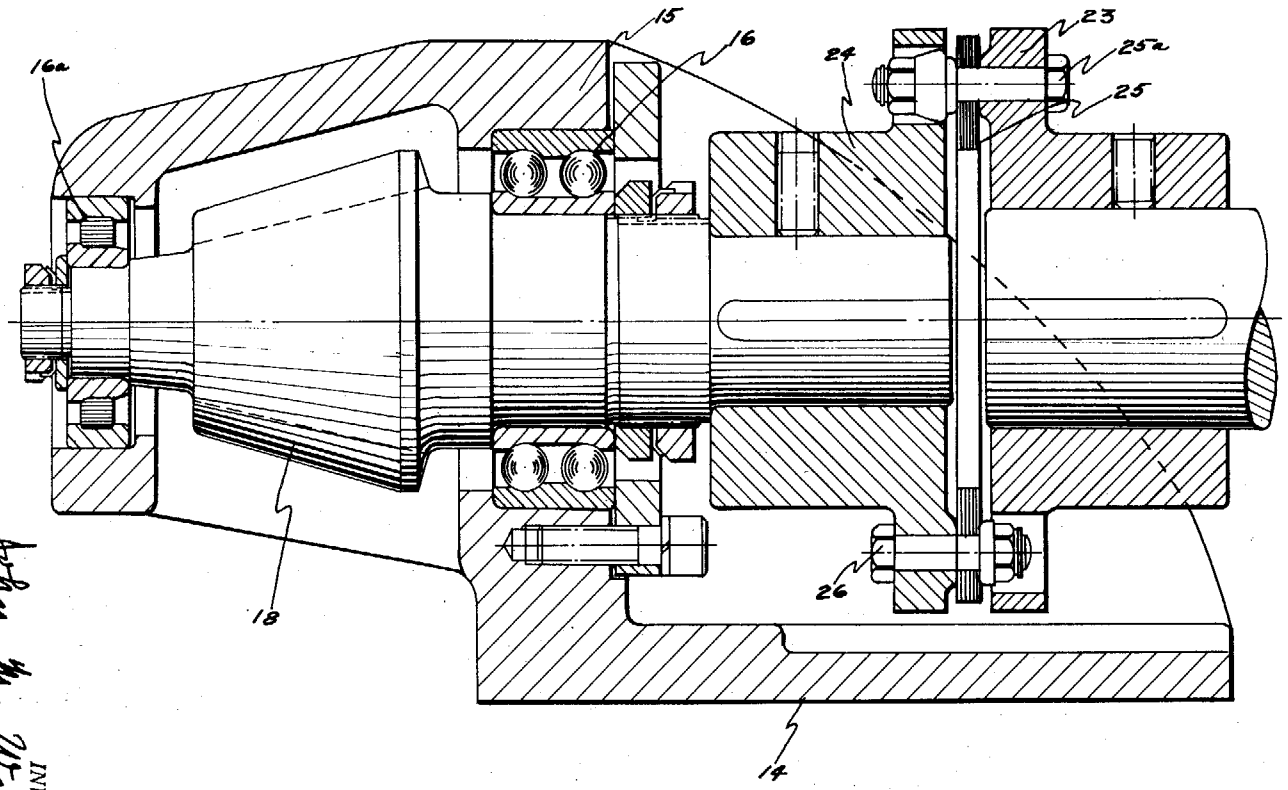
Figure 3 is a vertical section taken along the center axis of the drive shaft and drive pinion on a larger scale.

The illustrated example of my invention embodies a bed 1, with ways 2 thereon, and a column or housing 3. Mounted on the bed, and with V's to engage the ways thereof is the planer table 5, which is driven by a rack 6, on its under side.

The drive motor, the casing of which is shown at 7 is located in the angle between the column 3 and the bed, so as to conserve floor space. The controls for speed and direction are part of the electrical equipment of the motor, and will be of standard character. From the casing projects the shaft 9. The motor casing rests on the floor and is bolted to the floor.

The shaft 9 is provided with a flexible coupling 10 which connects it to a floating drive shaft 11, which is preferably tubular for cutting down weight while maintaining high torque resistance. The shaft 11 extends into the drive chamber. In the drive chamber within the bed the shaft is provided with a flexible coupling 12 to the drive pinion shaft 13, in co-axial relation.

Located on a pad 14 in the drive chamber of the bed is a support 15 for the drive pinion shaft 13. This support has spaced lateral walls which clear the coupling 12 and mounts bearings 16 and 16*a* for the spindle or shaft 13, in an inverted cup shaped portion thereof which overhangs a portion of the hypoid beveled gear 17 of the drive. On the spindle 13 between its bearings is the drive pinion 18 which is a beveled hypoid in construction also.

The drive pinion 18, on the shaft 13, engages the gear 17, and the shaft 19 of this gear has fixed upon it the spiral pinion 20. The pinion 20 meshes with a gear 21, and the pinion 22*a* on the same shaft meshes with the bull wheel 22. It is this bull wheel which engages the rack on the under side of the planer table. The shaft 19 is located properly to serve also as the drive shaft for the feed drive on the adjacent housing of the planer.

The two flexible couplings are illustrated as of like structure but various types are produced commercially and will serve the purpose. The one shown comprises two flanged heads 23 and 24 keyed to the shafts to be connected. Between the heads lie a series of annular spring steel washers. The flanges are bolted by special headed bolts 26, to the annular assembly of spring annuli, the flanges of the heads being apertured to permit this.

Instead of so many reduction gears in the drive chamber, for small machines, the number can be cut down using the single hypoid gear to drive the spindle of the bull wheel pinion, a rearrangement and relocation of parts to accomplish this being apparent without additional drawings.

The use of spiral gears in the drive is not mandatory, nor the use of hypoid pinion and gear for connecting in the floating shaft. As to the hypoid gear the present form of drive permits their use and their ability to run more smoothly than spiral beveled gears, and their better load carrying capacity adds materially to the excellence of the drive.

It is desirable, although not mandatory, to mount the hypoid drive pinion between bearings on its spindle rather than to have it overhang the bearings.

As compared to the worm drive noted above, and generally termed a Seller's drive, the floating shaft in the present structure must withstand only ¼ to ⅕ of the torque in operation, as applied to this previous construction. The right angle drive shaft construction, which is the standard drive of today, uses seven gears between the drive shaft and the bull gear in order to locate the bull gear properly with relation to the point of tool application and clear the planer side heads at the same time with the drive shaft. Such a gear train uses some gears with no reduction and such practically idler gears in heavy duty reversing drives such as planers, are simply sources of trouble. In my present drive there are at the most only five gears in the train to the bull gear, each a reduction gear.

With my construction I have found that the motor alignment is not critical even for the smoothest performance. A one degree variation in angle between the motor shaft and the drive gear pinion is readily permissible with the illustrated form of flexible coupling. With such flexible couplings are universal joints, which would be satisfactory with my invention, the alignment of the floating shaft would be subject to wide variation. The motor vehicles of today use universal joints for their drive shafts which are satisfactory in my construction. The type of flexible coupling illustrated in the described example was selected because it requires no lubrication and is quite free from developing back lash in use, but yet protects against simple misalignment.

Having thus described my invention, what I claim as new and desire to secure by Letters Patent is:

1. In combination a planer having a bed and a worktable reciprocable thereon, said table having a rack on its under side, and said planer having a column on at least one side of said bed, a drive for said table comprising a motor disposed in the angle between said bed and said column, said motor having a shaft connection entering said bed at an angle, a train of reduction gears in said bed connecting said shaft connection with said rack, said shaft connection comprising a rigid shaft flexibly connected directly to said motor, and flexibly connected to the first gear in said train of reduction gears, said shaft constituting the high speed low torque side of the drive.

2. A drive according to claim 1, wherein said train of reduction gears comprises not more than five gears.

3. The combination of claim 1 wherein said shaft connection is free of bearings between said flexible connections, thereby compensating for misalignment between said motor and train of reduction gears at the said high speed low torque side of the train.

4. The combination of claim 1 wherein said motor is mounted independently of said train of reduction gears.

*5. In combination a planer having a bed and a worktable reciprocable thereon, said table having a rack on its under side, and said planer having a column on at least one side of said bed, a drive for said table comprising a motor disposed in the angle between said bed and said column, said motor having a shaft connection entering said bed at an angle, a train of reduction gears in said bed connecting said shaft connection with said rack, said shaft connection comprising a rigid shaft connected directly to said motor, said shaft constituting the high speed low torque side of the drive.*

*6. In combination a planer having a bed and a worktable reciprocable thereon, said table having a rack on its under side, and said planer having a column on at least one side of said bed, a drive for said table comprising a motor disposed in the angle between said bed and said column, said motor having a shaft connection entering said bed at an angle, a train of reduction gears in said bed connecting said shaft connection with said rack, said shaft connection comprising a rigid shaft flexibly connected directly to said motor, said shaft constituting the high speed low torque side of the drive.*

JOHN M. WALTER.

REFERENCES CITED

The following references are of record in the file of this patent or the original patent:

UNITED STATES PATENTS

| Number | Name | Date |
|---|---|---|
| 497,754 | Lewis | May 16, 1893 |
| 1,350,525 | Sears | Aug. 24, 1920 |
| 1,397,731 | Goetz et al. | Nov. 22, 1921 |
| 1,613,554 | Berthiez | Jan. 4, 1927 |
| 1,832,285 | Elmer | Nov. 17, 1931 |
| 2,202,263 | Parsons | May 28, 1940 |
| 2,343,504 | Gallimore | Mar. 7, 1944 |

FOREIGN PATENTS

| Number | Country | Date |
|---|---|---|
| 678,224 | Germany | July 11, 1939 |